United States Patent
Seiler et al.

(10) Patent No.: US 9,947,104 B2
(45) Date of Patent: Apr. 17, 2018

(54) PREVIEW VISUALISATION OF TRACKED NERVE FIBERS

(71) Applicant: Brainlab AG, Munich (DE)

(72) Inventors: Thomas Seiler, Puchheim (DE); Katrin Stedele, Munich (DE)

(73) Assignee: Brainlab AG, Munich (DE)

( * ) Notice: Subject to any disclaimer, the term of this patent is extended or adjusted under 35 U.S.C. 154(b) by 0 days.

(21) Appl. No.: 15/546,603

(22) PCT Filed: Feb. 11, 2015

(86) PCT No.: PCT/EP2015/052862
§ 371 (c)(1),
(2) Date: Jul. 26, 2017

(87) PCT Pub. No.: WO2016/128040
PCT Pub. Date: Aug. 18, 2016

(65) Prior Publication Data
US 2018/0012363 A1    Jan. 11, 2018

(51) Int. Cl.
G06K 9/48 (2006.01)
G06T 7/13 (2017.01)
G06T 7/181 (2017.01)

(52) U.S. Cl.
CPC ............. *G06T 7/13* (2017.01); *G06T 7/181* (2017.01); *G06T 2200/24* (2013.01); *G06T 2207/10092* (2013.01); *G06T 2207/20101* (2013.01); *G06T 2207/20104* (2013.01)

(58) Field of Classification Search
None
See application file for complete search history.

(56) References Cited

U.S. PATENT DOCUMENTS 6,859,203 B2    2/2005  van Muiswinkel et al.
2009/0232374 A1*  9/2009  Simon ............... G01R 33/56341
                                                           382/131
2013/0279772 A1* 10/2013  Stedele ................. G06T 7/0012
                                                           382/128

OTHER PUBLICATIONS

European Patent Office, International Search Report and Written Opinion corresponding to related PCT/EP2015/052862 dated Dec. 1, 2015, pp. 1-16.
Cardenes R., "Saturn User Manuel" Image Processing Laboratory, University of Valladolid, May 22, 2009; pp. 1-20, Retrieved from the Internet: URL: //www.1pi.tel.uva.es/saturn/downloads/Saturn1.0-eng.pdf [retrieved on Nov. 5, 2015] , XP055226177.
Cardenes, R. et al., "Saturn: A software application of tensor utilities for research in neuroimaging" Computer Methods and Programs in Biomedicine, vol. 97, No. 3, Mar. 1, 2010, pp. 264-279, XP026914969, Elsevier, Amsterdam, NL.
Golby, et al., "Interactive Diffusion Tensor Tractography Visualization for Neurosurgical Planning" Neurosurgery., vol. 68 No. 2, Feb. 1, 2011, pp. 496-505, XP055225000, Department of Radiology, Harvard Medical School Boston, MA, USA.

(Continued)

*Primary Examiner* — Mark Roz
(74) *Attorney, Agent, or Firm* — Tucker Ellis LLP (57) ABSTRACT

The invention relates to a medical data processing method for determining the position of a nerve fiber based on a diffusion image-based tracking method of tracking nerve fibers. In one example, the method encompasses comparing a set of tracked nerve fibers to a model of nerve fibers contained in atlas data.

20 Claims, 2 Drawing Sheets

(56) References Cited

OTHER PUBLICATIONS

Gouttard, et al., "Measures for Validation of DTI Tractography", Proceeding of SPIE, vol. 8314, Feb. 10, 2012, pp. 83140J-1-83140J-6, XP055226160, USA.
Guan, et al., "Paint and Track: Surface-based ROI Selection in DTI Fiber Tracking" Proc. Intl. Soc. Mag. Reson. Med 15 (2007) p. 1557, USA.
Maddah, et al.,"Automated Atlas-Based Clustering of White Matter Fiber Tracts from DTMRI", Medical Image computing and Computer-Assisted Intervention-MIC CAI 2005 Lecture Notes in Computer Science; LNCS, Springer, Berlin, DE, Jan. 1, 2005, pp. 188-195, XP019021631, ISBN 978-3-540-29327-9, USA.
Neurosurgery Journal:, "Interactive Diffusion Tensor Tractography Visualization for Neurosurgical Planning", Jan. 25, 2011, p. 1, XP054976179, Retrieved from the Internet: URL: https:// www. youtube.com/watch?v=KJErdrrtXsQ [retrieved on Nov. 3, 2015].
Pujol., "Diffusion MRI Analysis", Oct. 22, 2013, XP055228431, Retrieved from the Internet: URL: http://wiki.slicer.org/slicerWiki/images/1/1f/DiffusionMRIanalysis_Tutorial_SonjaPujol_2013. pdf,[retrieved on Nov. 13, 2015] Surgical Planning Laboratory, Harvard University, pp. 1-84, USA.

\* cited by examiner

PREVIEW VISUALISATION OF TRACKED NERVE FIBERS

RELATED APPLICATION DATA

This application is a national phase application of International Application No. PCT/EP2015/052862 filed Feb. 11, 2015 published in the English language.

The present invention is directed to a computer-implemented medical data processing method for determining the position of a nerve fiber based on a diffusion image-based tracking method of tracking nerve fibers, a corresponding computer program, non-transitory computer-readable program storage medium storing such a program, a computer running that program or comprising that program storage medium, and a system comprising that computer.

For deterministic fiber tracking (i.e. tracking of nerve fibers in e.g. a set of medical image data) it is necessary to define seed points which are then used as input for the tracking algorithm. Seed points can be collected from automatically segmented anatomical structures. If no such objects are available or in order to find a very specific neural tract, the user has to manually define a region of interest (ROI).

In a known product such as iPlan Cranial 3.x supplied by Brainlab AG, ROIs can be created by manual outlining, by defining cubic areas or by using existing objects that are generated by e.g. an automatic segmentation. Seed points are calculated within these ROIs and are used as input for the tracking algorithm. If the result of the tracking is not as expected, ROIs can be modified and new tracking calculations can be triggered until the result is satisfying for the user.

The result however strongly depends on the extent or quality of the drawn ROI. Important fibers might not be tracked because the manually drawn regions of interest do not represent the underlying anatomy.

It is hence desirable to provide a user with a possibility of efficiently exploring the medical image data to determine the position of fiber bundles of interest to the user. Thereby, the computational effort associated with running a tracking algorithm on the complete set of medical image data, which is potentially fruitless at least in specific aspects, can be avoided.

An object of the invention therefore is to provide a possibility for performing real-time diffusion image-based tracking of nerve fibers.

Aspects of the present invention and their embodiments are disclosed in the following. Different advantageous features can be combined in accordance with the invention wherever technically expedient and feasible.

EXEMPLARY SHORT DESCRIPTION OF THE PRESENT INVENTION

In the following, a short description of the specific features of the present invention is given which shall not be understood to limit the invention only to the features or a combination of the features described in this section.

The present invention relates for example to a method of determining and visualizing a set of nerve fibers which has been tracked on-the-fly during movement of a graphical selection tool in a medical image generated by diffusion tensor imaging, depending on the current position of the selection tool in the image. Furthermore, the invention in one example encompasses a consistency check whether the result of the tracking is plausible by comparing the tracking result to known position of nerve fibers, the corresponding information being gathered from for example predetermined atlas data.

GENERAL DESCRIPTION OF THE PRESENT INVENTION

In this section, a description of the general features of the present invention is given for example by referring to possible embodiments of the invention.

In one aspect, the invention is directed to a computer-implemented medical data processing method for determining a region of interest for conducting diffusion image-based tracking of nerve fibers. The method comprises the following exemplary steps which are (all) constituted to be executed by a computer (for example, a specific module such as a software module can be provided which contains code which, when executed on the electronic processor of the computer, provides the data processing functionality of the respective method step). The method steps are executed for example by the processor of such a computer, for example by acquiring data sets at the processor and determining data sets by the processor.

For example, medical image data is acquired which describes (specifically, defines) a medical image of an anatomical body part of a patient's body comprising the nerve fibers, the medical image having been generated by applying a diffusion-based medical imaging method to the anatomical body part. A medical imaging method usable to generate the medical image data is diffusion tensor imaging (DTI) which involves generating a magnetic resonance tomography of the anatomical body part (which comprises nervous tissue and can comprise at least part of the human brain) and analysing the diffusion of water molecules in the tissue from the tomography thus generated. The medical image data is in one example three-dimensional data, but can be displayed in a two-dimensional manner.

For example, tracking initiation data is acquired which describes (specifically, defines) a minimum fractional anisotropy and a minimum length of nerve fibers to be selected (for example from the medical image data) for tracking in the medical image data; and first recording mode data is acquired which describing whether a recording mode for recording the result of the tracking is enabled or disabled.

For example, initial position data is acquired which describes (specifically, defines) an initial position of a virtual tool in the medical image. As an even further example, tool selection data is acquired which describes the tool, wherein the tool is usable by a user for defining a potential region of interest. Specifically, the tool is a virtual pointing tool.

For example, seed point is determined based on (specifically, from) the medical image data, tracking initiation data and the initial position data. The seed point data describes (specifically, defines) a set of seed points serving as starting points for the tracking.

The method then continues, in an exemplary embodiment, with initiating, by the processor and based on (specifically, from) the medical image data and the seed point data, the tracking and writing the tracked nerve fibers into a data set called tracking result data. The tracking is conducted applying a known algorithm for DTI-based fiber tracking. Usable algorithms are known to person skilled in the art and described in for example Mori, S.; van Zijl, P. C. M.: Fiber Tracking: Principles and Strategies—A Technical Review. NMR In Biomedicine (2002) 15, pp. 468-480, the entire contents of which is incorporated into the present disclosure by reference.

For example, the method then determines, based on (specifically, from) the tracking result data, whether a nerve fiber has been tracked. If this determination results in that no fiber has been tracked, the method for example continues with acquiring and evaluating, by the processor, continuation data indicating whether the method shall continue, and if the evaluation results in that the continuation data indicates that the method shall not continue, ending, by the processor, the method. Otherwise (i.e. if the evaluation results in that the continuation data indicates that the method shall continue), at least one of the following two steps is executed:
- changing, by the processor, the tracking initiation data and acquiring the changed tracking data, repeating execution of the method starting from the step relating to (specifically, encompassing) initiating the tracking, and using the changed tracking initiation data as an input for a repetition of the step of initiating the tracking; and
- changing, by the processor, the initial position data and acquiring the changed initial position data, repeating execution of the method starting from the step of initiating the tracking, and using the changed initial position data as an input for a repetition of the step of initiating the tracking.

For example, the at least one of changing the tracking initiation data and changing the initial position data includes changing, by the processor, the tracking initiation data or changing, by the processor, the initial position data, respectively, based on (specifically, from) user input, which is effected for example by operating a key board or a mouse (specifically, a mouse key) to generate a corresponding command which is then acquired by the processor.

The continuation data indicates that the method shall end for example if the tracked fiber or the set of at least one already recorded fiber after the tracked fiber has been added corresponds at least within a predetermined limit to nerve fibers comprised in the model, and, if the tracked fiber or the set of at least one already recorded fiber after the tracked fiber has been added does not correspond at least within a predetermined limit to nerve fibers comprised in the model, the continuation data indicates that the method shall continue with at least one of the following:
- changing, by the processor, the tracking initiation data and acquiring the changed tracking data, repeating, by the processor, execution of the method starting from the step relating to (specifically, encompassing) initiating the tracking, and using, by the processor, the changed tracking initiation data as an input for a repetition of the step relating to (specifically, encompassing) initiating the tracking; and
- changing, by the processor, the initial position data and acquiring, at the processor, the changed initial position data, repeating, by the processor, execution of the method starting from the step relating to (specifically, encompassing) determining the seed point data, and using, by the processor, the changed initial position data as an input for a repetition of the step relating to (specifically, encompassing) determining the seed point data.

The continuation data is acquired for example based on (specifically, from) user input, which is effected for example by operating a key board or a mouse (specifically, a mouse key) to generate a corresponding command which is then acquired by the processor. The user input is generated based on (specifically, from) determining, based on (specifically, from) the recorded fiber visualisation data, whether the set of the at least one already recorded nerve fiber after the tracked nerve fiber has been added corresponds to a desired nerve fiber geometry. One specific embodiment of the disclosed method includes a step of acquiring atlas data describing a model of anatomical body part of the patient's body comprising the nerve fibers. Acquiring the continuation data then includes determining, based on (specifically, from) the atlas data and the at least one of the tracking result data and the recorded fiber visualisation data, whether the tracked fiber or the set of at least one already recorded fiber after the tracked fiber has been added corresponds at least within a predetermined limit to a nerve fiber comprised in the model. This encompasses specifically comparing the atlas data to the at least one of the tracking result data and the recorded fiber visualisation data, which can be done by applying for example a fusion algorithm (specifically, an image fusion algorithm, which encompasses an elastic fusion algorithm) to the atlas data so as to fuse it to the at least one of the tracking result data and the recorded fiber visualisation data.

The step of determining, based on (specifically, from) the atlas data and the at least one of the tracking result data and the recorded fiber visualisation data, whether the tracked fiber or the set of at least one already recorded fiber after the tracked fiber has been added corresponds at least within a predetermined limit to a nerve fiber comprised in the model includes
- determining, based on (specifically, from) the atlas data and the at least one of the tracking result data and the recorded fiber visualisation data, whether at least one of the end points and the path of the tracked fiber or the set of at least one already recorded fiber after the tracked fiber has been added corresponds at least within a predetermined limit to the at least one of the end points and the path of a nerve fiber comprised in the model.

If the determination based on (specifically, from) the tracking result data results in that a fiber has been tracked, the method continues for example with a step of determining tracked fiber visualisation data describing (specifically, defining) an image rendering of the tracked nerve fiber described by the tracking result data. If the determination based on (specifically, from) the tracking result data results in that no fiber has been tracked, for example second recording mode data is acquired which describes (specifically, defines) whether a recording mode for recording the result of the tracking is enabled or disabled, and execution of the method is then continued, by the processor, with repeating the method starting from the step relating to (specifically, encompassing) initiating the tracking.

In a further example of the invention, indication signal data is determined which describes an indication signal to be output to a user using the information content of the continuation data. Specifically, the indication signal is—as a part of the disclosed method—issued to a user using an indication device for indicating digital information, the indication signal. More specifically, the indication signal data comprises relative a visual or audio indication describing whether the method shall continue or end. The indication device hence may for example be a display device such as a monitor operatively coupled to a computer conducting the disclosed data processing.

For example, it is determined, based on (specifically, from) the first recording mode data, whether the recording mode is enabled or disabled, and
  if it is determined that the recording mode is not enabled, execution of the method is continued, by the processor, with (i.e. starting again from) the step relating to (specifically, encompassing) acquiring and evaluating the continuation data;

if it is determined that the recording mode is enabled, acquiring, at the processor, and evaluating, by the processor, recorded fiber data indicating whether a set of already at least one recorded nerve fiber (specifically, a plurality of recorded nerve fibers) exists to which set the tracked nerve fiber can be added. If this determination results in that the set of at least one already recorded nerve fiber exists (i.e. if the recorded fiber data indicates that the set of at least one already recorded nerve fiber exists), the tracked nerve fiber is added, by the processor, to the set of at least one already recorded nerve fiber, and recorded fiber visualisation data is determined which describes (specifically, defines) an image rendering (e.g. on a display device such as a monitor) of the set of the at least one already recorded nerve fiber after the tracked nerve fiber has been added, and execution of the method then continues with the step relating to (specifically, encompassing) acquiring and evaluating the continuation data. If evaluation, by the processor, of the recorded fiber data, results in that the set of at least one already recorded nerve fiber does not exist, the method continues with creating, by the processor, a data structure for recording a set of least one tracked nerve fiber. This data structure then serves as the set of at least one already recorded nerve fiber during the following repeated execution, by the processor, of the method starting from the step relating to (specifically, encompassing) adding the tracked nerve fiber to the set of at least one already recorded nerve fiber, in this case to the (previously and still empty) data structure.

A data structure for recording a tracked nerve fiber can be a specific class representing a bundle of fibers or any general container class that is able to hold several items, such as:

class FiberBundle—container for fibers;

class Fiber—container for points within a fiber plus additional information to each point.

In another aspect, the invention is directed to a computer program which, when running on a computer or when loaded onto a computer, causes the computer to perform the above-described method.

In a further aspect, the invention is directed to a non-transitory computer-readable program storage medium on which the aforementioned program is stored.

In an even further aspect, the invention is directed to a computer, for example a cloud computer, comprising a processor and a memory, wherein the aforementioned program is running on the processor or is loaded into the memory, or wherein the computer comprises the aforementioned program storage medium. The computer is for example an electronic data processing unit which is specifically configured to execute the aforementioned program, for example the electronic data processing unit of a medical navigation system or a medical procedure planning system (suitable for use e.g. in surgery or radiotherapy/radiosurgery or infusion therapy, for example for treating a brain tumour).

In an even further aspect, the invention relates to a (physical, for example electrical, for example technically generated) signal wave, for example a digital signal wave, carrying information which represents the aforementioned program, which comprises code means which are adapted to perform any or all of the method steps described herein.

It is within the scope of the present invention to combine one or more features of one or more embodiments or aspects of the invention in order to form a new embodiment wherever this is technically expedient and/or feasible. Specifically, a feature of one embodiment which has the same or a similar function to another feature of another embodiment can be exchanged with said other feature, and a feature of one embodiment which adds an additional function to another embodiment can for example be added to said other embodiment.

Definitions

In this section, definitions for specific terminology used in this disclosure are offered which also form part of the present disclosure.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The method in accordance with the invention is for example a data processing method. The data processing method is preferably performed using technical means, for example a computer. The data processing method is preferably constituted to be executed by or on a computer and for example is executed by or on the computer. For example, all the steps or merely some of the steps (i.e. less than the total number of steps) of the method in accordance with the invention can be executed by a computer. The computer for example comprises a processor and a memory in order to process the data, for example electronically and/or optically. The calculating steps described are for example performed by a computer. Determining steps or calculating steps are for example steps of determining data within the framework of the technical data processing method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is an augmented reality device (also referred to as augmented reality glasses) which can be used as "goggles" for navigating. A specific example of such augmented reality glasses is Google Glass (a trademark of Google, Inc.). An augmented reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. The monitor may also be the monitor of a portable, for example handheld, device such as a smart phone or personal digital assistant or digital media player.

The expression "acquiring data" for example encompasses (within the framework of a data processing method) the scenario in which the data are determined by the data processing method or program. Determining data for example encompasses measuring physical quantities and transforming the measured values into data, for example digital data, and/or computing the data by means of a computer and for example within the framework of the method in accordance with the invention. The meaning of "acquiring data" also for example encompasses the scenario in which the data are received or retrieved by the data processing method or program, for example from another program, a previous method step or a data storage medium, for example for further processing by the data processing method or program. The expression "acquiring data" can therefore also for example mean waiting to receive data and/or receiving the data. The received data can for example be inputted via an interface. The expression "acquiring data" can also mean that the data processing method or program performs steps in order to (actively) receive or retrieve the data from a data source, for instance a data storage medium (such as for example a ROM, RAM, database, hard drive, etc.), or via the interface (for instance, from another computer or a network). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. For example, the acquiring step does not involve an invasive step which would represent a substantial physical interference with the body, requiring professional medical expertise to be carried out and entailing a substantial health risk even when carried out with the required professional care and expertise. For example, the step of acquiring data, for example determining data, does not involve a surgical step and for example does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Atlas data describes (for example defines and/or represents and/or is) for example a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data. The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects. Anatomical structures are assigned grey values describing their response to at least one type of imaging radiation (such as their absorption of x-rays, defined for example in Hounsfield units). Thus, tissue types can be grouped into classes (so-called tissue classes) which define a specific type of tissue according to its physical properties such as absorption of the type of imaging radiation. The atlas can also be multi-modal, i.e. an atlas comprising tissue classes (tissue type information) which describes the image appearance of specific type of tissue in different imaging modalities, e.g. in x-ray-based imaging and magnetic resonance-based imaging, to allow matching the atlas with medical images having been generated by the corresponding imaging modality.

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

In this application, the term "image morphing" is also used as an alternative to the term "elastic image fusion", but with the same meaning.

Within the framework of this disclosure, the term of transformation denotes a linear mapping (embodied for example by a matrix multiplication) defining an image fusion algorithm such as at least one of an elastic and an inelastic fusion transformation. Elastic fusion transformations (for example, elastic image fusion transformations) are for example designed to enable a seamless transition from one dataset (for example a first dataset such as for example a first image) to another dataset (for example a second dataset such as for example a second image). The transformation is for example designed such that one of the first and second datasets (images) is deformed, for example in such a way that corresponding structures (for example, corresponding image elements) are arranged at the same position as in the other of the first and second images. The deformed (transformed) image which is transformed from one of the first and second images is for example as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are for example vectors of a deformation field. These vectors are determined by the optimisation algorithm in such a way as to result in an optimum degree of similarity. Thus, the optimum degree of similarity represents a condition, for example a constraint, for the optimisation algorithm. The bases of the vectors lie for example at voxel positions of one of the first and second images which is to be transformed, and the tips of the vectors lie at the corresponding voxel positions in the transformed image. A plurality of these vectors are preferably provided, for instance more than twenty or a hundred or a thousand or ten thousand, etc. Preferably, there are (other) constraints on the transformation (deformation), for example in order to avoid pathological deformations (for instance, all the voxels being shifted to the same position by the transformation). These constraints include for example the constraint that the transformation is regular, which for example means that a Jacobian determinant calculated from a matrix of the deformation field (for example, the vector field) is larger than zero, and also the constraint that the transformed (deformed) image is not self-intersecting and for example that the transformed (deformed) image does not comprise faults and/or ruptures. The constraints include for example the constraint that if a regular grid is transformed simultaneously with the image and in a corresponding manner, the grid is not allowed to interfold at any of its locations. The optimising problem is for example solved iteratively, for example by means of an optimisation algorithm which is for example a first-order optimisation algorithm, for example a gradient descent algorithm. Other examples of optimisation algorithms include optimisation algorithms which do not use derivations, such as the downhill simplex algorithm, or algorithms which use higher-order derivatives such as Newton-like algorithms. The optimisation algorithm preferably performs a local optimisation. If there is a plurality of local optima, global algorithms such as simulated annealing or generic algorithms can be used. In the case of linear optimisation problems, the simplex method can for instance be used.

In the steps of the optimisation algorithms, the voxels are for example shifted by a magnitude in a direction such that the degree of similarity is increased. This magnitude is preferably less than a predefined limit, for instance less than one tenth or one hundredth or one thousandth of the diameter of the image, and for example about equal to or less than the distance between neighbouring voxels. Large deformations can be implemented, for example due to a high number of (iteration) steps.

The determined elastic fusion transformation can for example be used to determine a degree of similarity (or similarity measure, see above) between the first and second datasets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can for example be determined on the basis of a determined correlation between the first and second datasets.

DESCRIPTION OF THE FIGURES

In the following, the invention is described with reference to the enclosed figures which represent a specific embodiment of the invention. The scope of the invention is not however limited to the specific features disclosed in the context of the figures, wherein.

Figure 1:
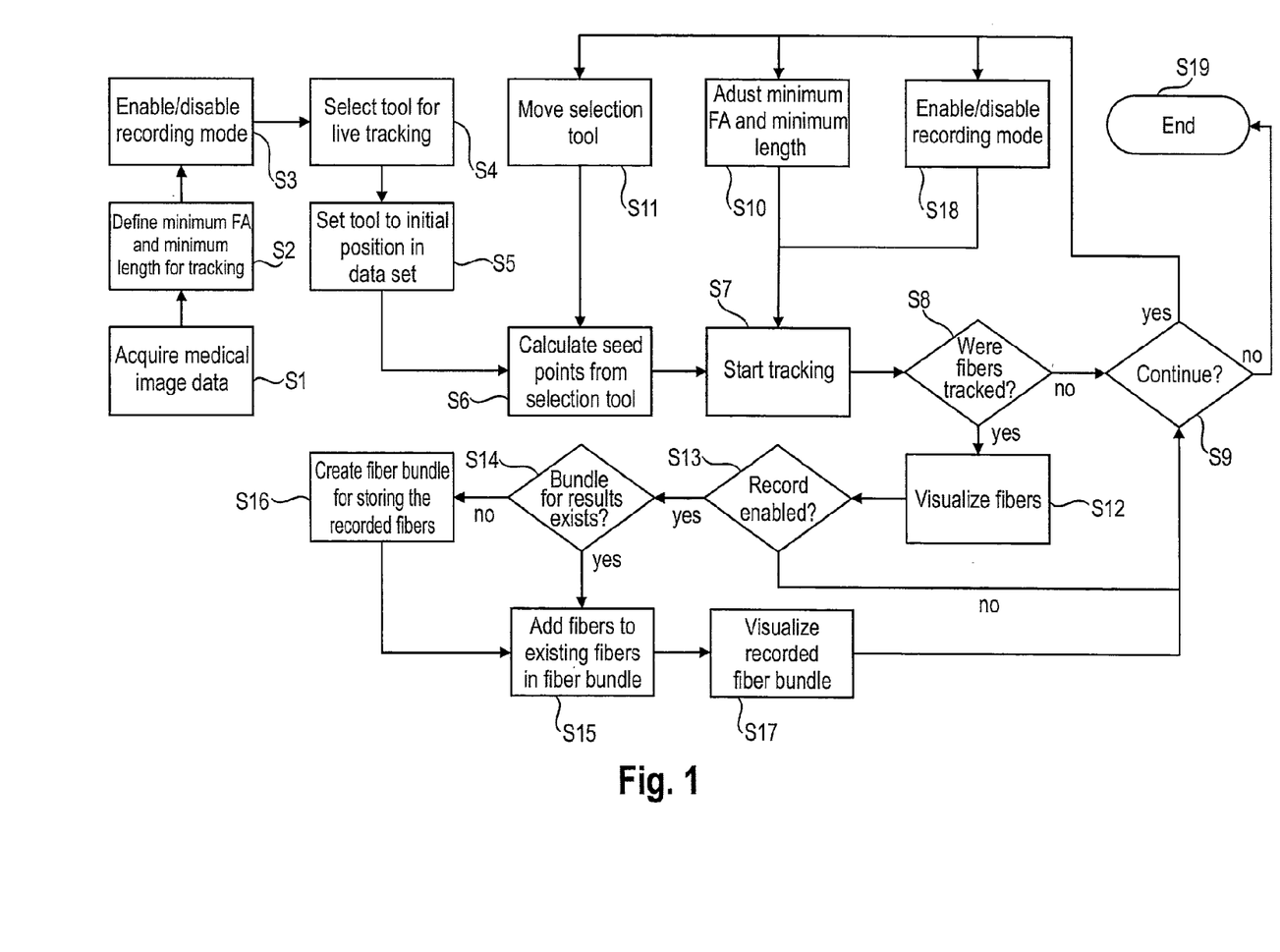
FIG. 1 is a flow diagram showing the basic steps of the disclosed method.

FIG. 1 presents an overview of the steps of the disclosed computer-implemented medical data processing method. The method starts with execution of step S1 which encompasses acquisition of the medical image data. In step S2, the tracking initiation data is acquired. In step S3, the first recording mode data is acquired. Subsequent and optional step S4 gives the user the possibility of selecting a virtual tool for conducting a live tracking functionality. The live tracking functionality encompasses outputting to the user a result of tracking nerve fibers on-the-fly while the tool is being moved over a display (graphical rendering) of medical image. Hence, it is not necessary to define a region of interest in an image region in which certain fiber bundles are expected to exist—rather, the disclosed method allows recoding a fiber right after it has been found by moving the tool in the image region of interest to a user. The tool is for example a selection tool such as a mouse pointer or a virtual object having any other (two-dimensional or three-dimensional) shape such as a graphically rendered frame or orb which may be used to select or define a two-dimensional or three-dimensional region in the medical image. The area covered by this shape is used to define seed points used for the fiber tracking in step S7. Tracking is started in step S7 as soon as the image area under the tool changes and any tracked fiber is visualized afterwards. Step S4 encompasses acquisition of the tool selection data. Step S5 encompasses acquisition of the initial position data. The seed point data is determined in step S6 and followed by starting the fiber tracking in step S7 by executing the step relating to initiating the tracking.

In subsequent step S8 it is determined whether the tracking has led to tracking a nerve fiber, for example of nerve fiber fulfilling the criteria defined in the tracking initiation data. If the method determines that this is not the case, the method continues with step S9 which encompasses determination of the continuation data. If it is determined that the tracking has led to tracking a nerve fiber, the method continues with step S12 which comprises determining the tracked fiber visualization data. In step S13 it is then determined whether the recording mode is disabled or enabled. If it is determined that the recording mode is disabled, the method continues with execution of step S9. If it is determined that the recording mode is enabled, the method continues with executing step S14 which encompasses acquiring and evaluating the recorded fiber data. The evaluation encompasses determining whether a set of already at least one recorded nerve fiber exists to which the tracked nerve fiber can be added. If this is not the case, the method continues step S16 which encompasses creating the data structure for recording a set of least one tracked nerve fiber in which the tracked fiber can be stored. After that or in case step S14 results in that a set of already at least one recorded nerve fiber exists to which the tracked nerve fiber can be added, the step continues with step S15 which encompasses adding the tracked nerve fiber to the set of at least one already recorded nerve fiber. In subsequent step S17, the recorded fiber visualisation data is determined for the set of at least one recorded nerve fiber which now includes the nerve fiber or nerve fibers tracked in preceding step S7. The method then proceeds to step S9.

If step S9 results in that the method shall end, the method proceeds to step S19 and execution of the method is ended (specifically, stopped). If step S9 results in that the method shall continue, the method continues with execution of at least one of step S10, step S11 and optional step S18. Step S10 encompasses changing the tracking the initiation data (for example, adapting it in a direction in which a better result of the tracking in step S7 is expected), the changed tracking initiation data then being usable as an input for repetition of the method starting from step S7. Step S11 encompasses changing the initial position data (for example, adapting in a direction in which a better result of determining the seed point data in step S6 is expected), the changed initial position data then being usable as an input for repetition of the method starting from step S6. Optional step S18 encompasses acquisition of the second recording mode data, and is followed by repeated execution of the method starting from step S7.

Figure 2:
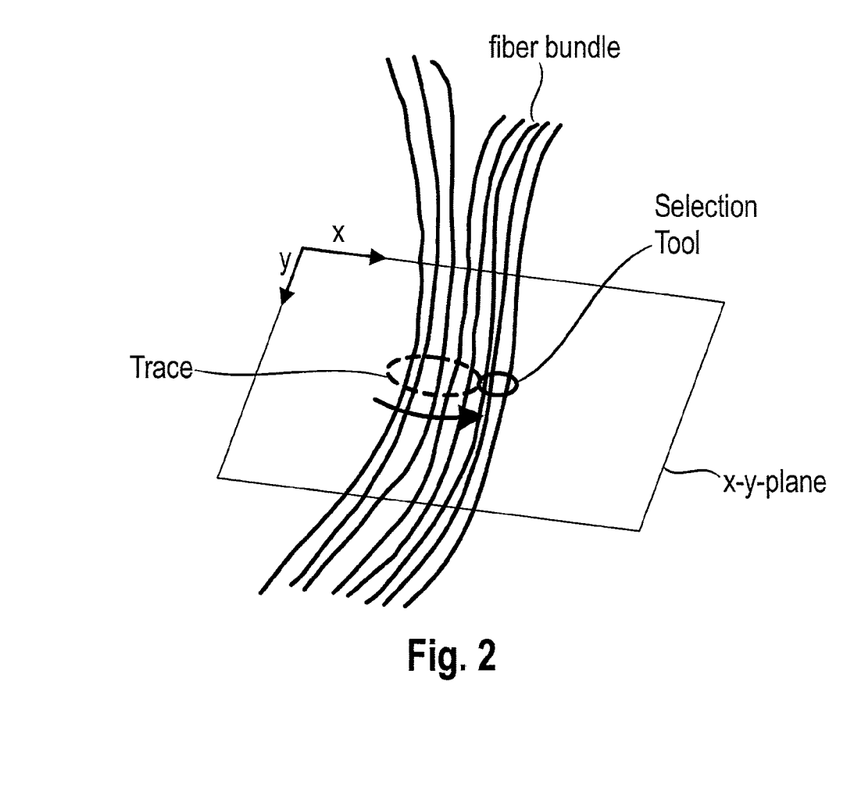
FIG. 2 shows the functionality of a selection tool operated to generate the initial position data.

The disclosed method provides the following benefits: Even if there is a small delay while calculating new fibers, the user gets almost immediate visual feedback about fibers passing through the current tool position. If the tool is moved and the user is not recording, fibers are removed. Otherwise, previously drawn fibers are kept and added to the currently tracked fiber bundle as if the user would use a brush and in parallel track the brushed area. Borders of fiber bundles, changes of the diffusion path ways and diffusion changes regarding the local fractional anisotropy are available immediately and help the user to get an impression about underlying anatomy or to track a complete fiber bundle as accurate as possible based on the quality of the underlying data and the brush (tool) shape. This is exemplified by FIG. 2 which shows a trace of movement (indicated by the arrow) of a circle-shaped tool (selection tool) and (only) a set (bundle) of tracked fibers (along for example predefined length) which traverse the x-y-plane defined by the position of the tool. Specifically, only nerve fibers are tracked which intersect that x-y-plane.

The invention claimed is:

1. A method for determining the position of a nerve fiber based on diffusion image-based tracking of nerve fibers, the method executing on a processor of a computer, and comprising:
   a) acquiring, at the processor, medical image data describing a medical image of an anatomical body part of a patient's body comprising the nerve fibers, the medical image generated by applying a diffusion-based medical imaging method to the anatomical body part;

b) acquiring, at the processor, tracking initiation data describing a minimum fractional anisotropy and a minimum length of nerve fibers to be selected for tracking;

c) acquiring, at the processor, first recording mode data describing whether a recording mode for recording the result of the tracking is enabled or disabled;

d) acquiring, at the processor, initial position data describing an initial position of a virtual tool in the medical image;

e) acquiring, at the processor, atlas data describing a model of the anatomical body part of the patient's body comprising the nerve fibers;

f) determining, by the processor, seed point data, the seed point data based on the medical image data, tracking initiation data, and the initial position data, and wherein the seed point data describes a set of seed points serving as starting points for the tracking;

g) initiating, by the processor, and based on the medical image data and the seed point data, the tracking, and writing the tracked nerve fibers into a tracking result data set;

h) determining, by the processor and based on the tracking result data set, whether a nerve fiber has been tracked, and if it is determined that no fiber has been tracked, h1) acquiring, at the processor, and evaluating, by the processor, continuation data indicating whether the method shall continue, and if the continuation data indicates that the method shall not continue, ending, by the processor, the method, otherwise at least one of:

changing, by the processor, the tracking initiation data and acquiring the changed tracking data, repeating execution of the method starting from step g) and using the changed tracking initiation data as an input for a repetition of step g); and changing, by the processor, the initial position data and acquiring the changed initial position data, repeating execution of the method starting from step f) and using the changed initial position data as an input for a repetition of step f);

if it is determined that a fiber has been tracked, h2) determining, by the processor, tracked fiber visualization data describing an image rendering of the tracked nerve fiber described by the tracking result data;

i) determining, by the processor and based on the first recording mode data, whether the recording mode is enabled or disabled, and if it is determined that the recording mode is not enabled, continuing, by the processor, execution of the method with step h1);

if it is determined that the recording mode is enabled, acquiring, at the processor, and evaluating, by the processor, recorded fiber data indicating whether a set of already at least one recorded nerve fiber exists to which the tracked nerve fiber can be added, and if the evaluation results in that the set of at least one already recorded nerve fiber exists, i1) adding, by the processor, the tracked nerve fiber to the set of at least one already recorded nerve fiber, determining, by the processor, recorded fiber visualization data describing an image rendering of the set of the at least one already recorded nerve fiber after the tracked nerve fiber has been added, and continuing, by the processor, execution of the method with step h1), wherein the acquiring the continuation data of step h1) includes determining, by the processor, and based on the atlas data, and the at least one of the tracking result data and the recorded fiber visualization data, whether the tracked fiber, or the set of at least one already recorded fiber after the tracked fiber has been added, corresponds at least within a predetermined limit to a nerve fiber comprised in the model;

if it is determined that the set of at least one already recorded nerve fiber does not exist, i2) creating, by the processor, a data structure for recording a set of at least one tracked nerve fiber serving as the set of at least one already recorded nerve fiber, and continuing, by the processor, execution of the method with step i1).

2. The method according to claim 1, further comprising:

c1) acquiring, at the processor, tool selection data describing the tool usable by a user for defining a potential region of interest.

3. The method according to claim 2, wherein the tool is a virtual pointing tool.

4. The method according to claim 1, wherein the at least one of changing the tracking initiation data and changing the initial position data includes changing, by the processor, the tracking initiation data or changing, by the processor, the initial position data, respectively, based on user input.

5. The method according to claim 1, further comprising:

if the result of step h) indicates that no fiber has been tracked, acquiring, at the processor, second recording mode data describing whether a recording mode for recording the result of the tracking is enabled or disabled, and continuing, by the processor, execution of the method with step g).

6. The method according to claim 1, wherein the continuation data indicates that the method shall end if the tracked fiber or the set of at least one already recorded fiber after the tracked fiber has been added corresponds at least within a predetermined limit to nerve fibers comprised in the model, and wherein, if the tracked fiber or the set of at least one already recorded fiber after the tracked fiber has been added does not correspond at least within a predetermined limit to nerve fibers comprised in the model, the continuation data indicates that the method shall continue with at least one of the following:

changing, by the processor, the tracking initiation data and acquiring the changed tracking data, repeating, by the processor, execution of the method starting from step f) and using, by the processor, the changed tracking initiation data as an input for a repetition of step g); and changing, by the processor, the initial position data and acquiring, at the processor, the changed initial position data, repeating, by the processor, execution of the method starting from step f) and using, by the processor, the changed initial position data as an input for a repetition of step f).

7. The method according to claim 6, wherein determining, by the processor and based on the atlas data and the at least one of the tracking result data and the recorded fiber visualization data, whether the tracked fiber, or the set of at least one already recorded fiber after the tracked fiber has been added, corresponds at least within a predetermined limit to a nerve fiber comprised in the model includes:

determining, by the processor and based on the atlas data and the at least one of the tracking result data and the recorded fiber visualization data, whether at least one of the end points and the path of the tracked fiber or the set of at least one already recorded fiber after the tracked fiber has been added corresponds at least within a predetermined limit to the at least one of the end points and the path of a nerve fiber comprised in the model.

8. A non-transitory computer-readable storage medium having instructions stored thereon for determining the position of a nerve fiber based on diffusion image-based tracking of nerve fibers, which, when executed, cause a computer system to perform the steps comprising:

a) acquiring, at the processor, medical image data describing a medical image of an anatomical body part of a patient's body comprising the nerve fibers, the medical image generated by applying a diffusion-based medical imaging method to the anatomical body part;

b) acquiring, at the processor, tracking initiation data describing a minimum fractional anisotropy and a minimum length of nerve fibers to be selected for tracking;

c) acquiring, at the processor, first recording mode data describing whether a recording mode for recording the result of the tracking is enabled or disabled;

d) acquiring, at the processor, initial position data describing an initial position of a virtual tool in the medical image;

e) acquiring, at the processor, atlas data describing a model of the anatomical body part of the patient's body comprising the nerve fibers;

f) determining, by the processor, seed point data, the seed point data based on the medical image data, tracking initiation data, and the initial position data, and wherein the seed point data describes a set of seed points serving as starting points for the tracking;

g) initiating, by the processor, and based on the medical image data and the seed point data, the tracking, and writing the tracked nerve fibers into a tracking result data set;

h) determining, by the processor and based on the tracking result data set, whether a nerve fiber has been tracked, and if it is determined that no fiber has been tracked,
  h1) acquiring, at the processor, and evaluating, by the processor, continuation data indicating whether the method shall continue, and if the continuation data indicates that the method shall not continue, ending, by the processor, the method, otherwise at least one of:
    changing, by the processor, the tracking initiation data and acquiring the changed tracking data, repeating execution of the method starting from step g) and using the changed tracking initiation data as an input for a repetition of step g); and
    changing, by the processor, the initial position data and acquiring the changed initial position data, repeating execution of the method starting from step f) and using the changed initial position data as an input for a repetition of step f);

if it is determined that a fiber has been tracked,
  h2) determining, by the processor, tracked fiber visualization data describing an image rendering of the tracked nerve fiber described by the tracking result data;

i) determining, by the processor and based on the first recording mode data, whether the recording mode is enabled or disabled, and
  if it is determined that the recording mode is not enabled, continuing, by the processor, execution of the method with step h1);
  if it is determined that the recording mode is enabled, acquiring, at the processor, and evaluating, by the processor, recorded fiber data indicating whether a set of already at least one recorded nerve fiber exists to which the tracked nerve fiber can be added, and
    if the evaluation results in that the set of at least one already recorded nerve fiber exists,
      i1) adding, by the processor, the tracked nerve fiber to the set of at least one already recorded nerve fiber, determining, by the processor, recorded fiber visualization data describing an image rendering of the set of the at least one already recorded nerve fiber after the tracked nerve fiber has been added, and continuing, by the processor, execution of the method with step h1), wherein the acquiring the continuation data of step h1) includes determining, by the processor, and based on the atlas data and the at least one of the tracking result data and the recorded fiber visualization data, whether the tracked fiber, or the set of at least one already recorded fiber after the tracked fiber has been added, corresponds at least within a predetermined limit to a nerve fiber comprised in the model;
    if it is determined that the set of at least one already recorded nerve fiber does not exist,
      i2) creating, by the processor, a data structure for recording a set of at least one tracked nerve fiber serving as the set of at least one already recorded nerve fiber, and continuing, by the processor, execution of the method with step i1).

9. A computer system for determining the position of a nerve fiber based on diffusion image-based tracking of nerve fibers, the system comprising a processor, wherein the processor is configured to:

a) acquire medical image data describing a medical image of an anatomical body part of a patient's body comprising the nerve fibers, the medical image generated by applying a diffusion-based medical imaging method to the anatomical body part;

b) acquire tracking initiation data describing a minimum fractional anisotropy and a minimum length of nerve fibers to be selected for tracking;

c) acquire first recording mode data describing whether a recording mode for recording the result of the tracking is enabled or disabled;

d) acquire initial position data describing an initial position of a virtual tool in the medical image;

e) acquire atlas data describing a model of the anatomical body part of the patient's body comprising the nerve fibers;

f) determine seed point data, the seed point data based on the medical image data, tracking initiation data, and the initial position data, and wherein the seed point data describes a set of seed points serving as starting points for the tracking;

g) initiate the tracking based on the medical image data and the seed point data, and write the tracked nerve fibers into a tracking result data set;

h) determine, based on the tracking result data set, whether a nerve fiber has been tracked, and
   if it is determined that no fiber has been tracked,
      h1) acquire and evaluate continuation data, wherein the continuation data indicates continue or not continue, and wherein, if the continuation data indicates continue, the processor is further configured to:
         change the tracking initiation data and acquire the changed tracking initiation data, and go to and repeat execution of step g) wherein the repeated execution of step g) uses the changed tracking initiation data as an input for the repeated execution of step g); or
         change the initial position data and acquiring the changed initial position data, and go to and repeat execution of step f), wherein the repeated execution of step f) uses the changed initial position data as an input for the repeated execution of step f);
   if it is determined that a fiber has been tracked,
      h2) determine tracked fiber visualization data describing an image rendering of the tracked nerve fiber described by the tracking result data;
i) determine, based on the first recording mode data, whether the recording mode is enabled or disabled, and
   if the recording mode is determined to be not enabled, go to and execute step h1);
   if the recording mode is determined to be enabled, acquire and evaluate recorded fiber data wherein the recorded fiber data indicates whether a set of at least one already recorded nerve fiber exists to which the tracked nerve fiber can be added, and
      if the evaluation results in a determination that the set of at least one already recorded nerve fiber exists,
         i1) add the tracked nerve fiber to the set of at least one already recorded nerve fiber, determine recorded fiber visualization data describing an image rendering of the set of the at least one already recorded nerve fiber after the tracked nerve fiber has been added, and go to and execute step h1), wherein, within step h1) the processor is further configured to determine, based on the atlas data, and the at least one of the tracking result data and the recorded fiber visualization data, whether the tracked fiber, or the set of at least one already recorded fiber after the tracked fiber has been added, corresponds at least within a predetermined limit to a nerve fiber comprised in the model:
      if the evaluation results in a determination that the set of at least one already recorded nerve fiber does not exist,
         i2) create a data structure for recording a set of at least one tracked nerve fiber serving as the set of at least one already recorded nerve fiber, and continuing, by the processor, execution of the method with step i1).

10. The system of claim 9, wherein the processor is further configured to:
c1) acquire, at the processor, tool selection data describing the tool usable by a user for defining a potential region of interest.

11. The system of claim 10, wherein the tool is a virtual pointing tool.

12. The system of claim 9, wherein the at least one of changing the tracking initiation data and changing the initial position data includes the processor being further configured to change the tracking initiation data or change the initial position data, respectively, based on user input.

13. The system of claim 9, wherein the processor is further configured to determine the result of step h), and if the determination of the result of step h) indicates that no fiber has been tracked, acquire second recording mode data describing whether a recording mode for recording the result of the tracking is enabled or disabled, and continue execution at step g).

14. The system of claim 9, wherein the continuation data indicates that processing shall end if the tracked fiber or the set of at least one already recorded fiber after the tracked fiber has been added corresponds at least within a predetermined limit to nerve fibers comprised in the model, and
   wherein, if the tracked fiber or the set of at least one already recorded fiber after the tracked fiber has been added does not correspond at least within a predetermined limit to nerve fibers comprised in the model, the continuation data indicates that processing and shall continue and the processor is further configured to:
      change the tracking initiation data and acquire the changed tracking data, repeating processing starting from step f) and using the changed tracking initiation data as an input for a repetition of processing of step g); or
      change the initial position data and acquire the changed initial position data, repeating processing starting from step f) and using the changed initial position data as an input for a repetition of processing of step f).

15. The system of claim 14, wherein, when determining, based on the atlas data and the at least one of the tracking result data and the recorded fiber visualization data, whether the tracked fiber, or the set of at least one already recorded fiber after the tracked fiber has been added, corresponds at least within a predetermined limit to a nerve fiber comprised in the model, the processor is further configured to:
   determine, based on the atlas data and the at least one of the tracking result data and the recorded fiber visualization data, whether at least one of the end points and the path of the tracked fiber or the set of at least one already recorded fiber after the tracked fiber has been added corresponds at least within a predetermined limit to the at least one of the end points and the path of a nerve fiber comprised in the model.

16. The non-transitory computer readable storage medium of claim 8, wherein the instructions cause the computer system to perform the additional steps comprising:
c1) acquiring, at the processor, tool selection data describing the tool usable by a user for defining a potential region of interest.

17. The non-transitory computer readable storage medium of claim 16, wherein the tool is a virtual pointing tool.

18. The non-transitory computer readable storage medium of claim 8, wherein the at least one of changing the tracking initiation data and changing the initial position data includes changing, by the processor, the tracking initiation data or changing, by the processor, the initial position data, respectively, based on user input.

19. The non-transitory computer readable storage medium of claim 8, wherein the instructions cause the computer system to perform the additional steps comprising:
   if the result of step h) indicates that no fiber has been tracked, acquiring, at the processor, second recording mode data describing whether a recording mode for recording the result of the tracking is enabled or disabled, and continuing, by the processor, execution of the method with step g).

20. The non-transitory computer readable storage medium of claim 8, wherein the continuation data indicates that the method shall end if the tracked fiber or the set of at least one already recorded fiber after the tracked fiber has been added corresponds at least within a predetermined limit to nerve fibers comprised in the model, and wherein, if the tracked fiber or the set of at least one already recorded fiber after the tracked fiber has been added does not correspond at least within a predetermined limit to nerve fibers comprised in the model, the continuation data indicates the instructions shall cause the computer system to perform one of the following steps:

changing, by the processor, the tracking initiation data and acquiring the changed tracking data, repeating, by the processor, execution of the method starting from step f) and using, by the processor, the changed tracking initiation data as an input for a repetition of step g); and changing, by the processor, the initial position data and acquiring, at the processor, the changed initial position data, repeating, by the processor, execution of the method starting from step f) and using, by the processor, the changed initial position data as an input for a repetition of step f).

* * * * *